US006683653B1

(12) United States Patent
Miyake et al.

(10) Patent No.: US 6,683,653 B1
(45) Date of Patent: Jan. 27, 2004

(54) ELECTRONIC CAMERA AND DIAL CONTROL DEVICE OF ELECTRONIC EQUIPMENT

(75) Inventors: Michihiro Miyake, Asaka (JP); Yoichi Nagumo, Asaka (JP); Kentaro Tokiwa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/241,309

(22) Filed: Feb. 1, 1999

(30) Foreign Application Priority Data

| Feb. 2, 1998 | (JP) | ............................................. 10-021274 |
| Feb. 2, 1998 | (JP) | ............................................. 10-021275 |
| Feb. 2, 1998 | (JP) | ............................................. 10-021276 |

(51) Int. Cl.$^7$ ........................ H09N 5/225; G03B 17/02
(52) U.S. Cl. ...................... 348/373; 348/376; 396/535; 396/540
(58) Field of Search ................................ 348/373, 375, 348/376, 396.1; D16/200, 202; 396/535, 540

(56) References Cited

U.S. PATENT DOCUMENTS

| 5,283,606 A | * | 2/1994 | Konno et al. ................ 396/299 |
| 5,430,511 A | * | 7/1995 | Paff et al. .................... 348/143 |
| 5,634,152 A | * | 5/1997 | Kato et al. ................... 396/158 |
| 5,729,289 A | * | 3/1998 | Etoh ........................... 348/373 |
| D408,044 S | * | 4/1999 | Tanaka et al. ............. D16/202 |
| 5,970,267 A | * | 10/1999 | Inazuka ....................... 396/380 |
| 6,122,003 A | * | 9/2000 | Anderson ............... 348/207.99 |
| 6,181,380 B1 | * | 1/2001 | Toyofuku et al. ............ 348/373 |
| 6,208,380 B1 | * | 3/2001 | Misawa ....................... 348/375 |
| 6,411,332 B1 | * | 6/2002 | Whitby et al. ............... 348/376 |
| 6,441,854 B2 | * | 8/2002 | Fellegara et al. ....... 348/333.13 |
| 6,519,003 B1 | * | 2/2003 | Swayze ....................... 348/375 |

FOREIGN PATENT DOCUMENTS

| EP | 0946045 A2 | * | 9/1999 | ............ H04N/1/21 |
| JP | 6-31812 | | 8/1994 | .......... H04N/5/225 |
| JP | 8-122842 | | 5/1996 | ............ G03B/7/08 |
| JP | 9-230438 | | 9/1997 | ........... G03B/13/12 |

* cited by examiner

*Primary Examiner*—Wendy R. Garber
*Assistant Examiner*—Lin Ye
(74) *Attorney, Agent, or Firm*—Sughrue Mion, PLLC (57) ABSTRACT

When the interior of the electronic camera is seen from the back side, a battery is arranged at the part corresponding to the inside of a grip part arranged at the right side of the casing so that the long axis of the battery is along the right side of the casing, and an imaging part including a taking lens and a CCD is arranged at the upper left. Below the imaging part, an LCD monitor and a memory card holder are arranged parallel to a plane perpendicular to the optical axis of the taking lens. In this arrangement, the components of the camera are arranged in a compact size. On the back face of the camera body, a mode dial is arranged at a position that can be operated by the thumb of a hand holding the grip part. The mode dial is capable of rotating within a plane perpendicular to the optical axis of the taking lens. A dial control device including the mode dial has a double structure that comprises a push-type cross key, which is able to incline in upward, downward, right and left directions, and a ring-shaped rotatable mode dial at the circumference of the cross key. This dial control device achieves a multiple function dial/button, which is slim, easy to operate and compact.

20 Claims, 7 Drawing Sheets

ELECTRONIC CAMERA AND DIAL CONTROL DEVICE OF ELECTRONIC EQUIPMENT

BACKGROUND OF THE INVENTION

1. Field of the Invention

The present invention relates to an electronic camera, and more particularly to the arrangement of components in an electronic camera, which converts a captured image into image data and records the image data in a recording medium, and the arrangement of control members.

The present invention also relates to a dial control device of electronic equipment, and more particularly to a dial control device that makes it possible to change multiple functions even in a small space.

2. Description of Related Art

An ordinary electronic camera comprises an imaging part, which includes a taking lens and an imaging device such as a charge-coupled device (CCD); a signal circuit part, which processes an image signal obtained by the imaging device; a recording part for recording image data: an image display such as a liquid crystal display (LCD) monitor, which displays the captured image; a battery for supplying electric power; and a control part for changing image-recording modes and displays, etc. The size and operability of the entire electronic camera depends mainly on the layout of the components.

Recently, there has been an earnest desire to develop a compact electronic camera. Since the compact electronic camera is difficult to operate, it is important to develop an electronic camera that is small and easy to operate.

Japanese Patent Provisional Publication No. 9-230438 discloses providing a visual field frame changeover dial at substantially the center of the back face of the camera. According to this arrangement, the camera, which is held by one hand, is difficult to operate, and a positional relationship between the dial and the image display is not taken into consideration at all.

A push button or a rotary dial is used for the control part of much conventional electronic equipment such as electronic cameras. As the electronic equipment becomes smaller and increases the functions, it is an important factor to allot a space for arranging the control part and improve the operability. Japanese Utility Model Publication No. 6-31812 discloses a switch button structure wherein a rotary knob is arranged around an ON/OFF push button. This switch button structure, however, has only one function of switching ON/OFF an operating button provided inside the knob, and it is impossible to enter a variety of commands. Japanese Patent Provisional Publication No. 8-122842 discloses a control part structure wherein two control parts (a changeover dial and a changeover lever), which change image-recording modes of the camera, are arranged coaxially with one another so that they can be rotated separately. According to this control part structure, there must be a difference in height between the two rotary control members so that the inside rotary member and the outside rotary member can be rotated separately. In fact, the control knob of the changeover lever projects over the changeover dial. In this mode, the camera is difficult to operate with only one hand, and it is not satisfactory in view of the design due to the unevenness of the surface.

SUMMARY OF THE INVENTION

The present invention has been developed in view of the above-described circumstances, and has as its object the provision of the electronic camera that is easy to operate and compact.

It is another object of the present invention to provide the dial control device of the electronic equipment, which is easy to operate, inputs a variety of commands, and achieves the satisfactory appearance with little unevenness.

To achieve the above-mentioned objects, the present invention is directed to an electronic camera comprising: an imaging part including a taking lens and an imaging device for capturing an image; an image display for displaying the image captured by the imaging part; a recording part for recording, in a card-shaped recording medium, image data representing the image captured by the imaging part; a battery for supplying electric power to the camera; and a casing for containing the imaging part, the image display, the recording part and the battery therein, the casing being substantially rectangular-parallelepipedic and provided with a grip part to be gripped on an external surface thereof; wherein, when the camera is seen from a back thereof, the imaging part is arranged at the upper left part of the casing; the grip part is arranged at the right part of the casing; the battery is arranged at the right part of the casing corresponding to an inside of the grip part such that a long axis of the battery is along the grip part and the right side of the casing; the image display is arranged along the back face of the casing and at the left of the battery so as not to overlap with the battery; and the recording part is arranged behind and parallel to the image display such that the card-shaped recording medium is inserted to and extracted from the left side of the casing along a plane perpendicular to an optical axis of the taking lens.

According to the present invention, the electronic camera is compact since the imaging part, the image display, the recording part and the battery of the camera are arranged in the minimum space.

Seen from the cameraman holding the grip part, the image display is positioned at the lower left part of the back face of the camera. Hence, there is no possibility that the display screen is covered with the hand, and the display is easy to view. Moreover, the inlet for the card-shaped recording medium is provided at the opposite side of the grip part (the left side of the casing), and thus, the recording medium is inserted and extracted easily while the grip part is held by the hand.

According to the present invention, a finder is incorporated in an optical block including the taking lens and the imaging device of the imaging part. Since the image-capturing optical system and the finder optical system are incorporated into one block as a unit, the optical finder can be arranged close to the taking lens to reduce the parallax. Seen from the back of the camera, the imaging part is arranged at the upper left part of the camera, and the optical finder is necessarily arranged at the upper left part of the camera. The cameraman holding the grip part can easily look through the finder.

According to the present invention, an electronic flash is arranged above the battery. Seen from the front of the camera, the electronic flash is provided above the grip part, in other words, at the upper left part of the camera. A finger of the hand holding the grip part is positioned below the electronic flash, and this prevents the finger from obstructing the emission of light. Depending on how the camera is held, however, the finger may cover the electronic flash window. To avoid this, a projection is preferably formed at the electronic flash window at the front of the casing so that the projection can prevent the finger holding the grip part from covering the electronic flash window.

To achieve the above-mentioned object, the present invention is directed to an electronic camera comprising: an imaging part including a taking lens and an imaging device for capturing an image; an image display for displaying the image captured by the imaging part, the image display being arranged on a back face of a camera body; a grip part for being gripped, the grip part being arranged at a side of the camera body; a dial control device arranged on the back face of the camera body at such a position as to be operated by a thumb of a hand gripping the grip part, the dial control device being capable of rotating within a plane perpendicular to an optical axis of the taking lens.

According to the present invention, the dial control device is arranged on the back face of the camera body at such a position as to be operated by the thumb of the hand holding the grip part formed at the side of the camera body. For this reason, it is easy to operate the dial control device using only one hand.

The dial control device is preferably arranged at the upper right part of the back face of the camera, and the image display is preferably arranged at the lower left of the dial control device. Such an arrangement reduces the possibilities that the display screen of the image display is covered with the right hand of the cameraman when the dial control device is operated by the thumb of the hand holding the grip part. In addition, it is easy to operate the dial control device correctly while looking at the display screen.

The dial control device is preferably provided with a function of giving instructions to switch or change the displays on the image display. Such a function makes it possible to switch/change the displays by using only one hand while looking at the display on the image display.

According to the preset invention, a control key for switching on and off the image display is provided at the back of the camera body at such a position as to be operated by the thumb of the hand holding the grip part. According to the present invention, the cameraman holding the grip part can easily switch on and off the display by moving the thumb.

In the electronic camera of the present invention, a thumb rest is preferably provided at the back of the camera body at a position that may be reached by the thumb of the hand holding the grip part. The thumb rests on the thumb rest when not operating the dial control device.

According to another mode of the thumb rest, a depressed part may be formed at the center of the dial control device so that the thumb can rest on the depressed part when not operating the dial control device. In this case, the depressed part may be formed in the center of a member forming the dial control device, or the depressed part may be formed in a member that is different from the rotary member and this member may be arranged at the center of the rotary member to serve as the thumb rest.

The dial control device is preferably shaped like a truncated cone, and a skidproof part for being operated by the thumb is provided on an oblique surface of the truncated cone. The use of this dial control device achieves the appearance with little unevenness on the back surface of the camera. Also, the portability is improved, and the electronic camera has a good design.

In a concrete example of the dial control device, it is preferable to use a dial control device that has a double structure provided with a ring-shaped dial member and a button control member which is arranged concentrically within the dial member and is capable of inclining in a plurality of directions corresponding to a plurality of functions. Such a structure achieves a multiple function changeover control part that is easy to operate even in a small space.

To achieve the above-mentioned object, the present invention is directed to a dial control device of electronic equipment comprising: a ring-shaped rotatable dial member; a dial position determining means for determining a plurality of rotational positions of the dial member; a button control member capable of inclining in multiple directions according to a pressed position thereof, the button control member being arranged at the center of the dial member; and a button direction determining means for determining at least two inclining directions of the button control members among a plurality of possible inclining directions.

According to the present invention, the ring-shaped dial member is arranged at the circumference of the push-type button control member, which is capable of inclining in a plurality of directions. For this reason, the inside button control member can give a variety of instructions according to the inclining directions, and the outside dial member can change and select a variety of commands according to the rotational positions. The control device with the double structure is easy to operate since the outside dial member is rotated and the inside button control member is pressed. This realizes a multiple function button/dial that is easy to operate even in a small space.

According to the present invention, the depressed part is preferably formed at the top of the button control member. This makes it easier to press the edge part of the top face of the button control member, and the depressed part can be used as the thumb rest.

According to the present invention, the dial control device is substantially truncated cone shaped, and the dial member is provided with a skidproof part on an oblique surface thereof. This form achieves a satisfactory appearance with little unevenness, and makes the thickness (height) of the button control member inconspicuous in view of the design. Since the skidproof part, on which the thumb is placed during the rotation, is provided at the dial member of the oblique surface of the truncated cone, the thin dial member can be rotated easily without slipping.

It is particularly advantageous if the dial control device according to the present invention is applied to an electronic camera which converts an image captured by an imaging means into an image signal and records image data representing the captured image in a recording medium. This makes the electronic camera smaller and easier to operate.

The dial control device with the double structure, which is composed of the button control member and the dial member, may also be provided at the back of the electronic camera body. Since the control device of the present invention is thin as mentioned previously, the outside surface of the electronic camera has little unevenness even if the dial control device is provided at the back of the camera. The control device is preferably arranged at such a position as to be operated by the thumb of the hand holding the grip part of the camera, so that the control device can easily be operated with only one hand.

If the dial control device of the present invention is used for the electronic camera, the button control member is used to give instructions to change the zooming magnifications and advance frames during the reproduction, and the dial member is used to select and change the image-recording modes.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A description will hereunder be given of preferred embodiments for an electronic camera and a dial control device according to the present invention. In the following explanations, the dial control device is applied to the electronic camera.

Figure 1:
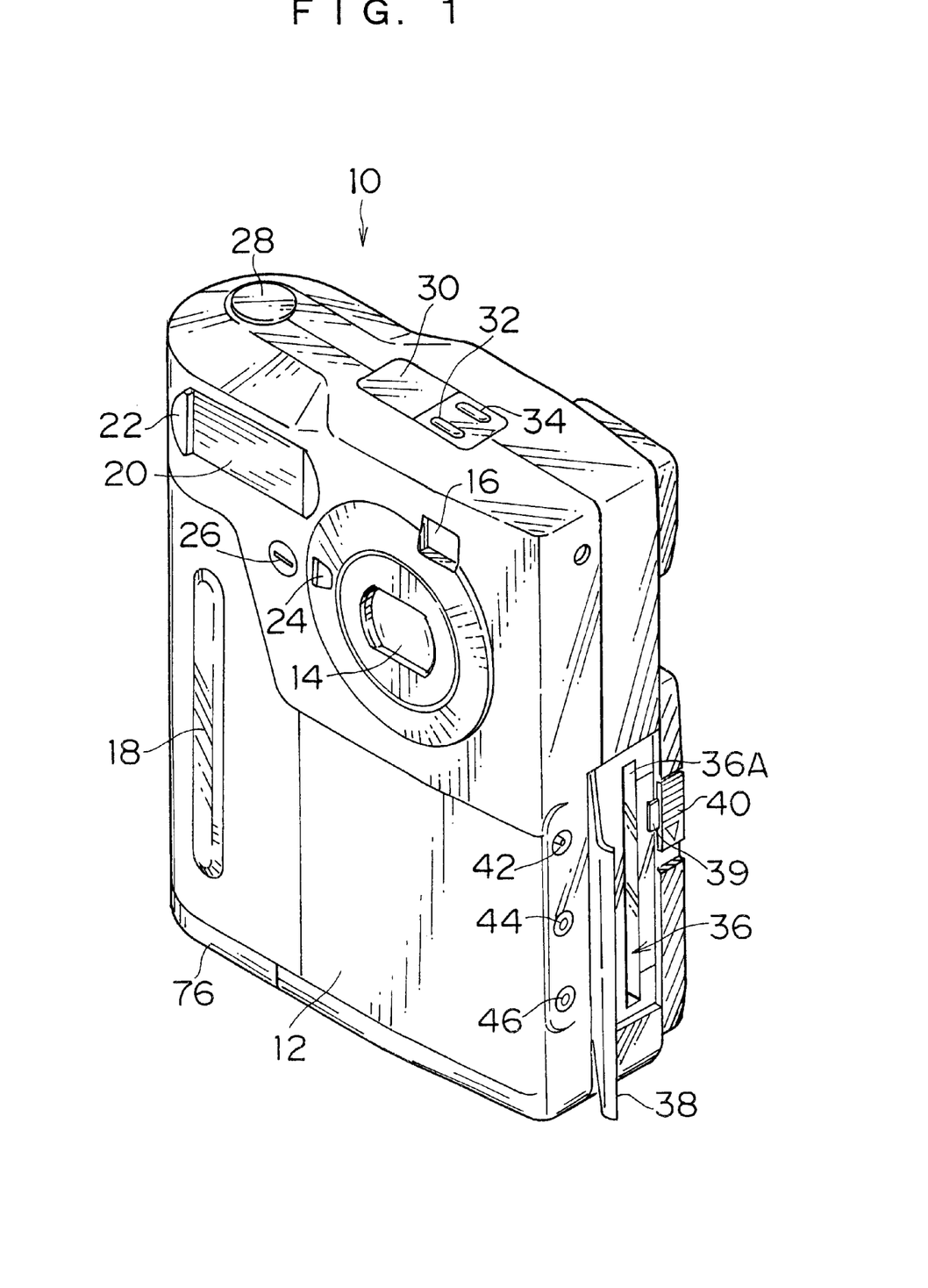
FIG. 1 is a perspective view illustrating the appearance of an electronic camera according to an embodiment of the present invention.

FIG. 1 is a perspective view illustrating the appearance of the electronic camera according to an embodiment of the present invention. A casing 12 of the electronic camera 10 is substantially rectangular-parallelepipedic. The width of the camera 10 is smaller than the length, and the thickness of the camera 10 is smaller than the width.

A taking lens 14 is arranged at the upper right of the front face of the casing 12, and a finder window 16 is provided above the taking lens 14. Although the structure of the taking lens 14 is not illustrated in detail, a single-focus lens with f=7.6 mm is used to realize an angle of view equivalent to a lens of f=35 mm in the conventional camera using 35 mm film. A CCD (which is not illustrated) is arranged behind the taking lens 14. It is necessary to select the proper number of pixels in the CCD in relation to the desired image quality. For instance, the use of the CCD with the 1.5 million pixels would realize the high image quality and the high resolution (1280×1024 pixels). The video output is 480 or more of the horizontal resolution in the reproduction.

In FIG. 1, a grip part 18 is formed vertically at the left side of the casing 12, and a cameraman grips the grip part 18 with the right hand to hold the camera.

An electronic flash 20 is provided above the grip part 18, or at the upper left corner of the front face of the casing 12. The electronic flash 20 is located so that it will not be covered by the hand holding the grip part 18. A projection 22 is formed at the left edge of the electronic flash 20 in FIG. 1 in order to prevent an index finger of the hand holding the grip part 18 from covering the electronic flash window. An electronic flash light adjustment sensor 24 and a self-timer lamp 26 are provided at the left side of the taking lens 14.

A shutter release 28, which gives instructions to start the image-recording, and an LCD panel 30 are provided at the top of the casing 12. An electronic flash key 32 and a macro key 34 are arranged by the LCD panel 30. The shutter release 28 can be pressed in two stages. When the shutter release 28 is pressed to the first stage, an automatic focusing (AF) and an automatic exposure (AE) operate and lock AE and AF. When the shutter release 28 is pressed completely, the image-recording is performed.

The LCD panel 30 shows information relating to the state of the camera, an image-capturing mode, etc. For example, the information such as the battery checking, a number of frames which may be recorded, a number of a reproduced frame, whether the electronic flash flashes or not, a macro mode, a recording image quality, and the number of pixels are displayed.

The electronic flash key 32 is used to flash the electronic flash according to the image-capturing conditions and prohibits the electronic flash from flashing. Every time the electronic flash key 32 is pressed, the electronic flash is circularly changed to "automatic flash", "reducing red eye", "compulsory flash", "prohibit flash" in that order. The electronic flash setting, which can be selected by the electronic flash key 32, is shown on the LCD panel 30.

The macro key 34 is a key for setting a short-distance (macro) image-capturing mode. Pressing the macro key 34 permits the short-distance image-capturing of approximately 9 cm to 50 cm.

A recording part or a smart medium holder 36 is provided at the right side of the camera 10 in FIG. 1, or at the opposite side of the grip part 18. A smart medium (which is not illustrated in FIG. 1) equivalent to the recording medium is inserted into the smart medium holder 36. In the electronic camera 10 of this embodiment, the smart medium (an image memory card) is used to record the image data, but a variety of other cards such as a PC card, a flash memory card, an IC card, a floppy disk and a magnetic optical disk (MO) may also be used as the image recording medium.

In the camera 10, the smart medium holder 36 is arranged so that a long axis of an inlet 36A is in the lengthwise direction of the camera 10 and the smart medium can be inserted and extracted along a plane perpendicular to the optical axis of the taking lens 14. A smart medium cover 38 is openably provided at the inlet 36A of the smart medium holder 36 through a hinge mechanism, and the smart medium cover 38 covers the inlet 36A. When the smart medium cover 38 is closed, an engaging means 39 holds the smart medium cover 38 in the closed state. When a smart medium knob 40 is sled downward in FIG. 1, the engaging means 39 releases the smart medium cover 38 so that it can be opened.

As shown in FIG. 1, a power input terminal (DC IN 5V) 42, an image data output terminal (VIDEO OUT) 44, and a digital input/output terminal (RS232C) 46 are arranged vertically in that order at the left side of the smart medium holder 36.

Figure 2:
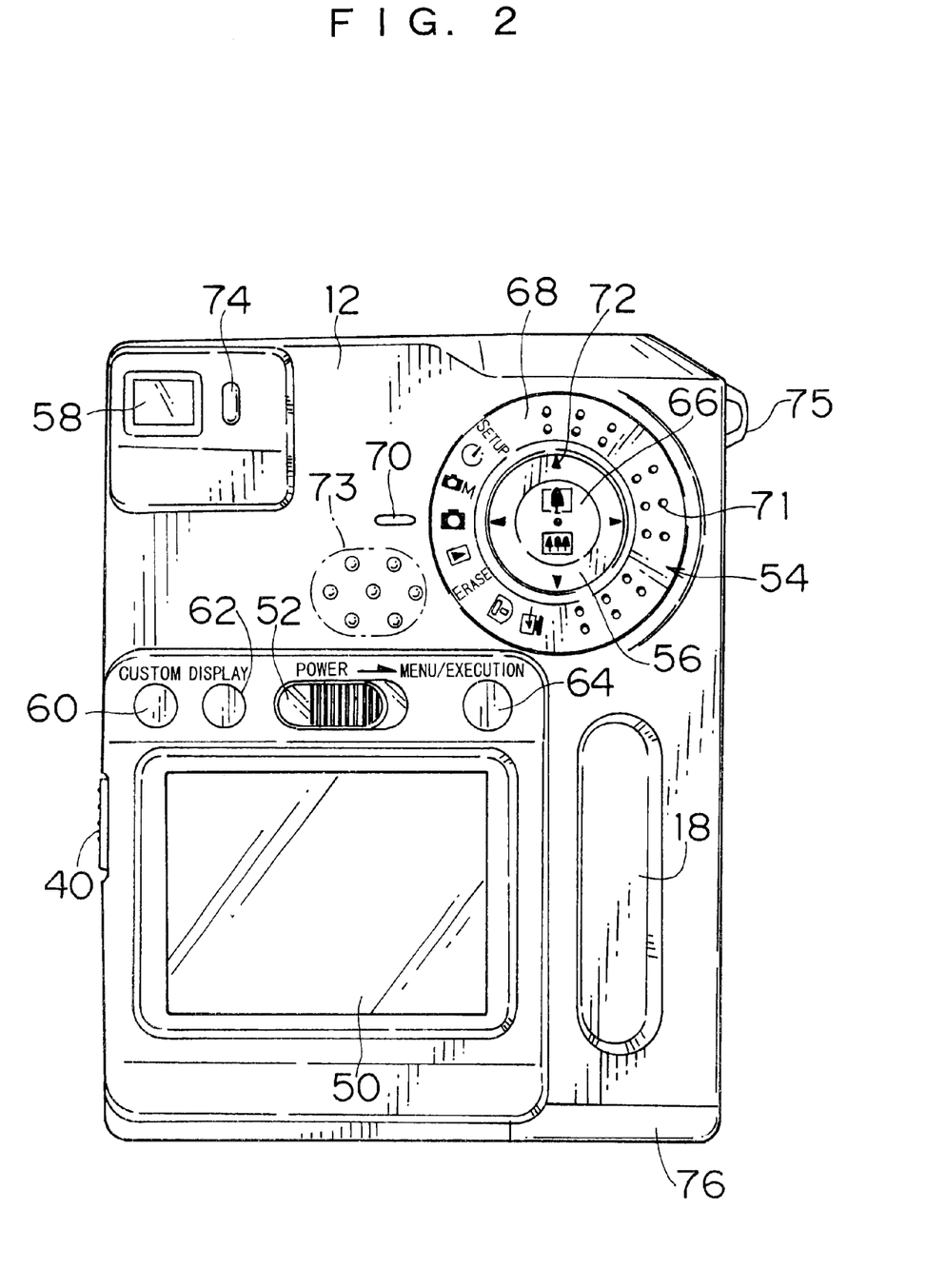
FIG. 2 is a back view of the electronic camera in FIG. 1.

FIG. 2 is a back view illustrating the electronic camera 10 in FIG. 1. An LCD monitor 50, a power switch 52, a mode dial 54, a cross key 56, a finder 58, etc. are provided at the back of the electronic camera 10.

The LCD monitor 50 displays the image captured through the CCD, the reproduced images read from the smart medium, and so forth. For example, a 2-inch low temperature polysilicon LCD is used as the LCD monitor 50. As shown in FIG. 2, the LCD monitor 50 is arranged apart from the grip part 18 at the lower left part of the back face of the camera 10. A custom key 60, a display key 62, the power switch 52, and a menu/execution key 64 line up sideways along the top side of the LCD monitor 50.

The mode dial 54 and the cross key 56 are located at the upper right corner of the back face of the camera 10, in other words, at a position where the thumb of the right hand holding the grip part 18 is naturally placed. A dial control device comprises the mode dial 54 and the cross key 56, and it has a double structure. Specifically, a ring-shaped dial member or a ring member 68 corresponding to the mode dial 54 is arranged at the circumference of a button control member or a button member 66 corresponding to the cross key 56. The mode dial 54 at the circumference is rotatable clockwise and counterclockwise in FIG. 2.

The mode dial 54 is the control device for changing the functions (modes) of the camera 10 according to the set position of the dial. For example, marks or letters indicating eight modes "setup", "self-timer", "manual image-recording", "automatic image-recording", "reproduction", "erase", "protect image data", "connect to a personal computer (PC)" are marked on the surface of the mode dial 54 in that order from the top at their click positions halfway around the mode dial 54 (the left half in FIG. 2).

The mode is set by rotating the mode dial 54 clockwise or counterclockwise in FIG. 2 to set the marks or letters indicating a desired function among the eight modes to an index 70. Small embosses are formed on the surface of the mode dial 54 halfway around the mode dial 54 (the right half in FIG. 2), and these embosses are used as skidproof parts 71 during the rotation of the mode dial 54 (the thumb is put on the embosses).

Figure 4:
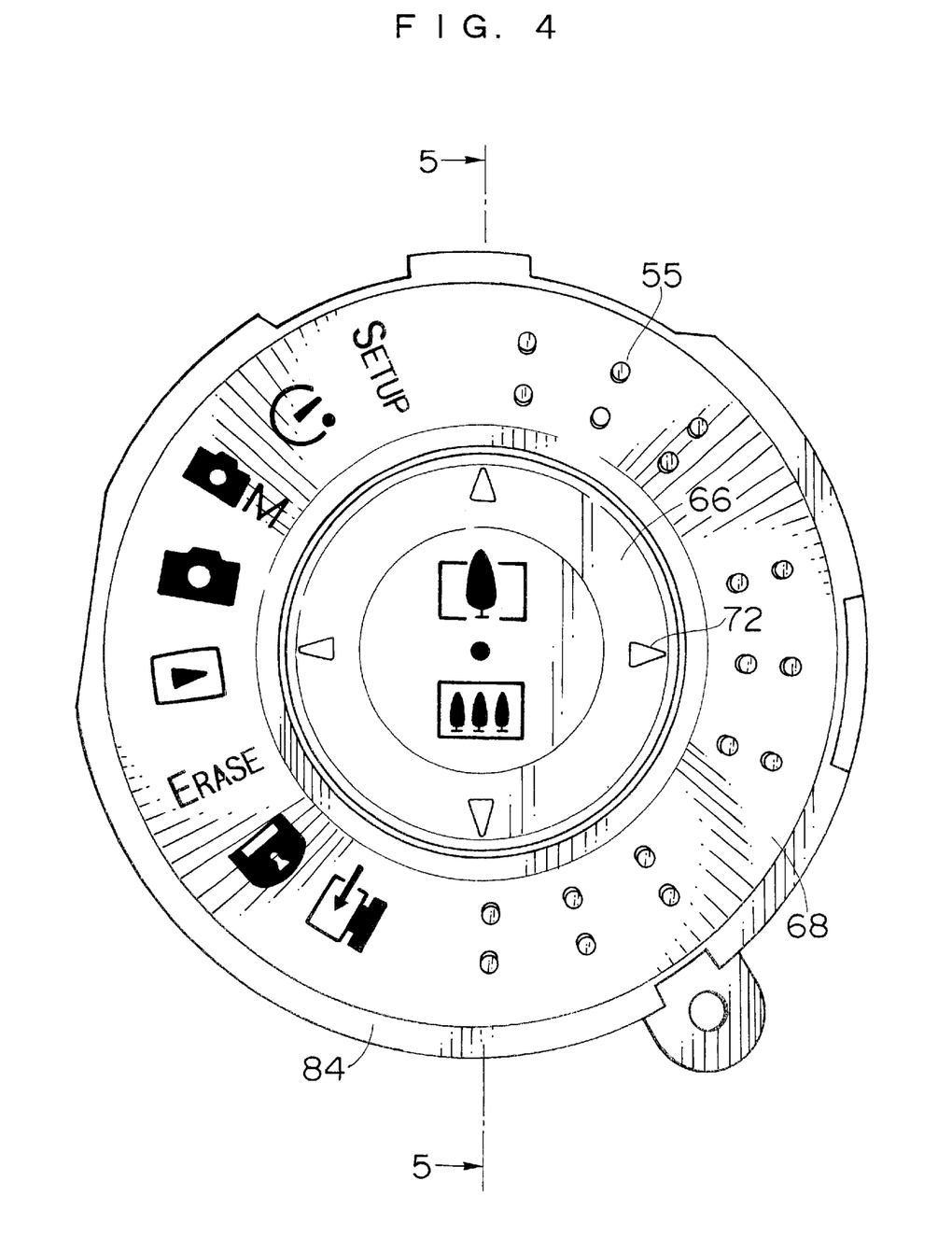
FIG. 4 is an enlarged view illustrating a dial control device, which consists of a mode dial and a cross key in FIG. 2.
Figure 5:
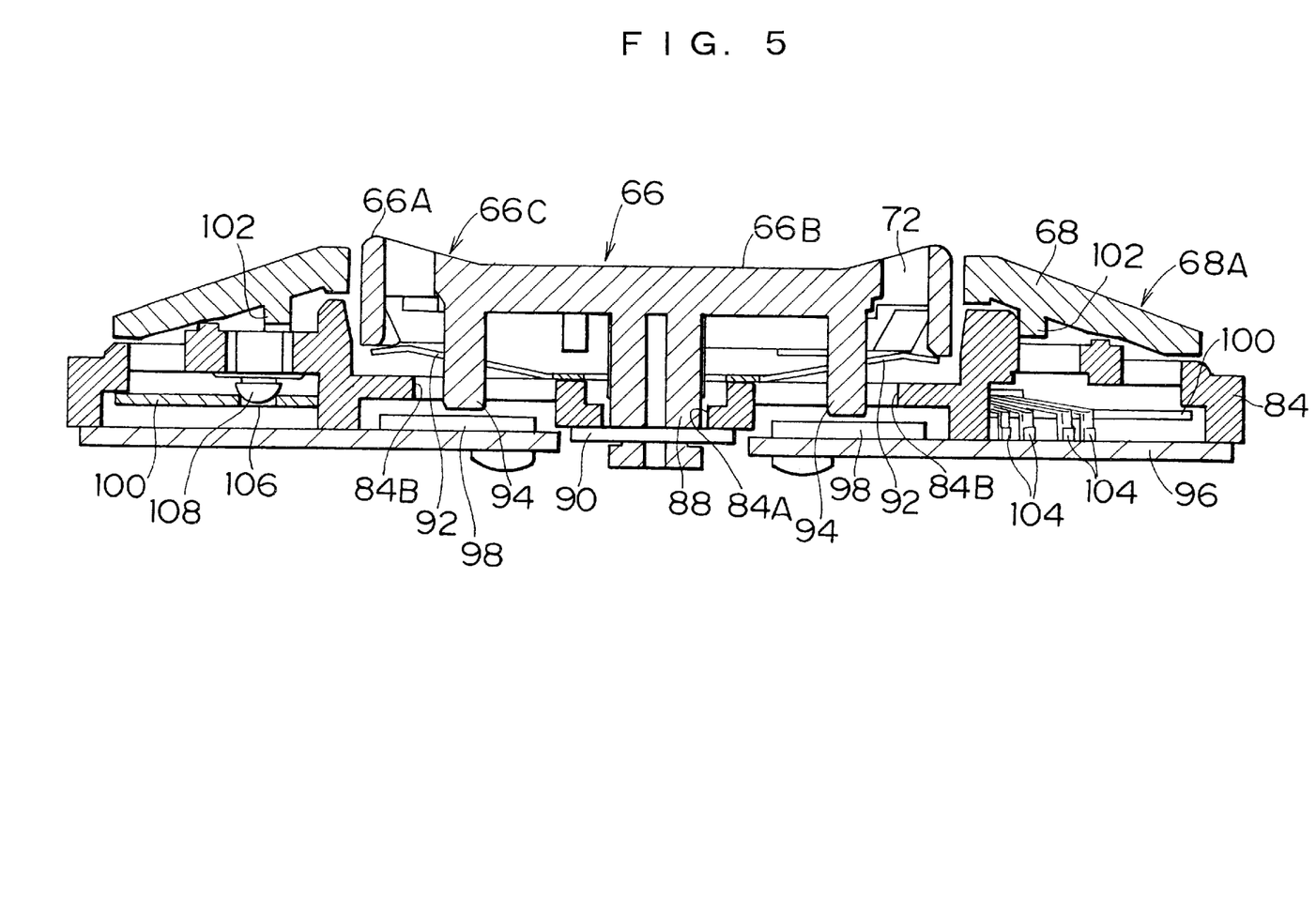
FIG. 5 is a sectional view of the dial control device in FIG. 4, taken along line 5—5.
Figure 6:
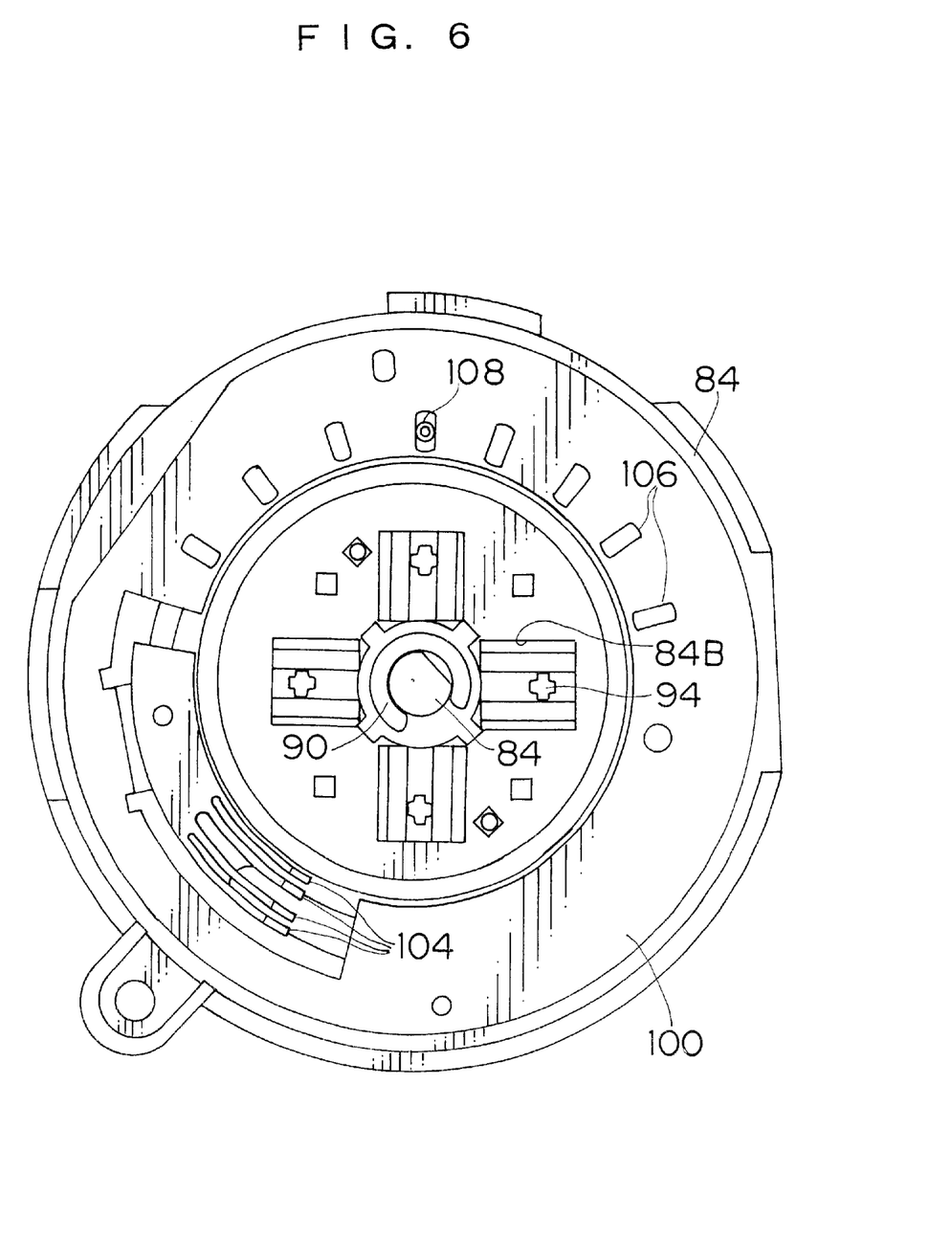
FIG. 6 is a back view of the dial control device in FIG. 4.

Triangular marks 72 are marked at the upper, lower, right and left of the button member 66 of the cross key 56 arranged inside the mode dial 54. The triangular marks 72 indicate the perpendicular four control directions. Pressing one of the triangular marks 72 or a part beside the mark inclines the button member 66 to designate the corresponding direction. The cross key 56 is used as a control key for selecting a variety of setting items and changing the settings. The cross key 56 is also used to adjust the magnification of the electronic zooming, give an instruction to move the center of zooming, and give an instruction to switch forward and backward the reproduced frames. The structure of the dial control device will be described later in detail (FIGS. 4–6).

Small embosses composing a thumb rest 73 are formed in an area between the mode dial 54 and the power switch 52 on the back face of the casing 12. The thumb rest 73 is provided substantially the center of an area where the thumb moves during the operation of the control parts such as the cross key 56, the mode dial 54 and the power source switch 52. Thus, the thumb rest 73 is positioned suitably for placing the thumb and holding the camera 10 steadily.

A finder lamp 74 is provided at the right side of the finder 58, and is turned on and blinking in three colors of green, orange and red, or turned off according to the state of the camera 10.

In FIG. 2, a strap attachment part 75 is provided at the top of the right side of the camera 10. A ring at the end of a hand strap (which is not illustrated) is passed through the strap attachment part 75. Then, the hand strap is passed through the end thereof and is pulled so that the hand strap can be attached to the strap attachment part 75. The cameraman passes his wrist through the attached hand strap, and then grips the grip part 18 to perform the image-capturing. This prevents the camera 10 from being dropped carelessly.

A battery cover 76 is openably provided below the grip part 18. Sliding the battery cover 76 to the right in FIG. 2 releases its engaging mechanism (which is not illustrated) so that the battery cover 76 can be opened downward in FIG. 2. Then, a substantially column-shaped battery (which is not illustrated in FIG. 2) is inserted from the bottom of the camera 10 vertically along the grip part 18, and the battery cover 76 is closed in a reverse procedure to the opening procedure so that the battery can be loaded.

Although which is not illustrated, an adjustment dial for adjusting the brightness of the LCD monitor 50 and a screw hole for a tripod are provided at the bottom of the camera 10.

Figure 3:
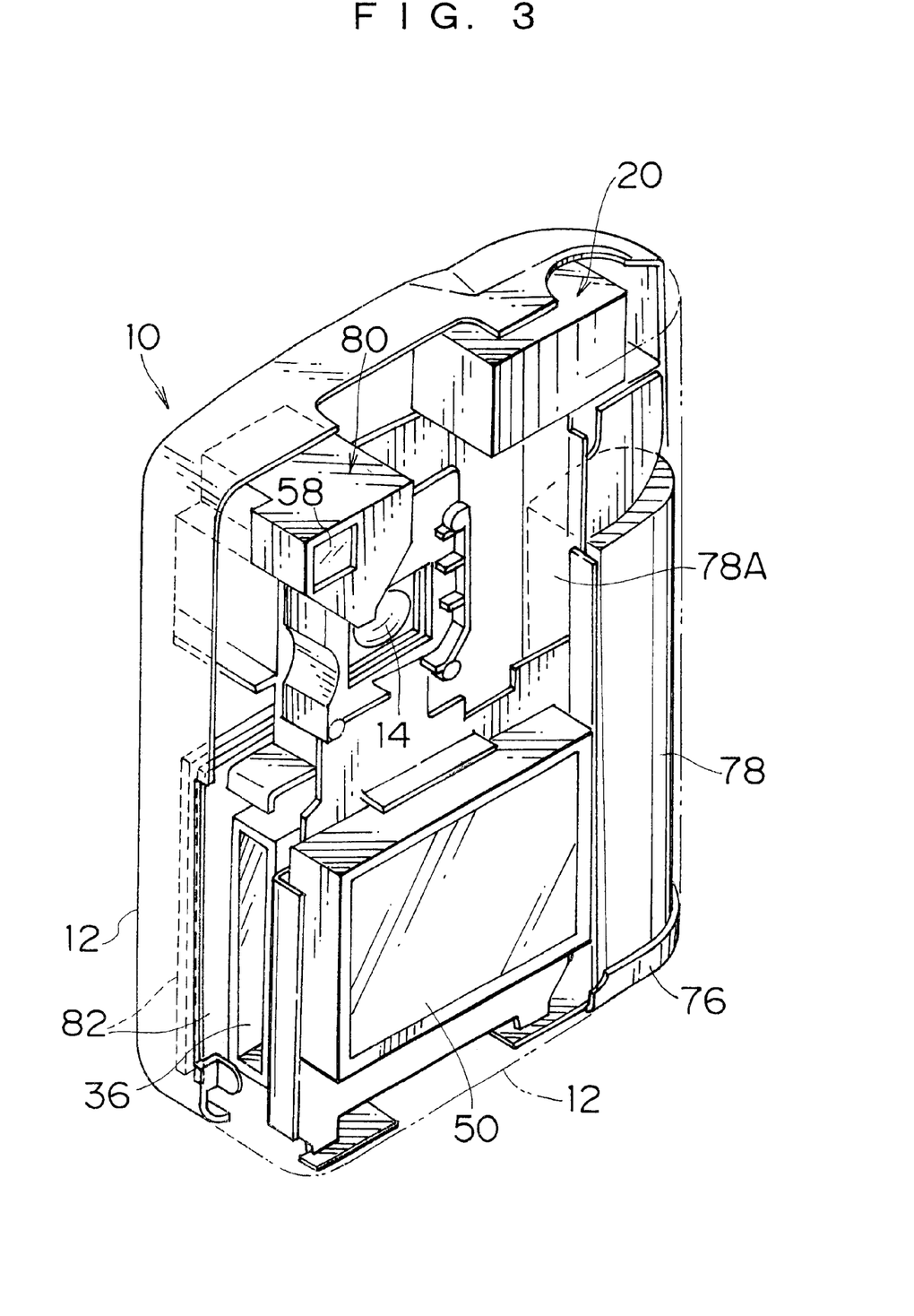
FIG. 3 is a perspective view illustrating the inner structure of the electronic camera.

FIG. 3 shows the state wherein the interior of the electronic camera 10 in FIG. 1 is seen from the back thereof. When the interior of the camera is seen from the back thereof, the battery 78 is placed at a part corresponding to an inside of the grip part 18 so that the long axis thereof is along the right side of the casing 12 as shown in FIG. 3. An optical unit 80 including the taking lens 14 and the finder 58 is arranged at the upper left part of the camera 10. Although which is not illustrated in FIG. 3, a circuit board, on which the CCD is mounted behind the taking lens 14, is attached to the optical unit 80.

The LCD monitor 50 is arranged below the optical unit 80, at the left side of the battery 78 and on the back face of the casing 12. The smart medium holder 36 is arranged behind and parallel to the LCD monitor 50 (at the front side of the camera 10). The smart medium holder 36 is placed in such a way that the inlet 36A for the smart medium faces to the left side of the camera 10.

An electronic circuit board 82, in which a signal processing circuit is loaded, is arranged behind the smart medium holder 36, or in a space between the smart medium holder 36 and the front face of the casing 12. The electronic circuit board 82 is arranged parallel to the LCD monitor 50 and the smart medium holder 36. The electronic flash 20 is arranged at the right side of the optical unit 80 and above the battery 78. A terminal part, which contacts with poles of the battery, is arranged in a space between the electronic flash 20 and the battery 78. Circuits of the electronic flash light adjustment sensor 24, etc. are housed in a space between the terminal part and the optical unit 80.

The height of the electronic camera 10 is approximately defined by the height of the battery 78, which is placed in the portrait orientation along the grip part 18. The electronic flash 20 is arranged above the battery 78, and the optical unit 80 and the LCD monitor 50 are arranged vertically beside the battery 78. The smart medium holder 36 and the electronic circuit board 82 are arranged behind and parallel to the LCD monitor 50. Thus, the components (the optical unit 80, the electronic flash 20, the battery 78, the LCD monitor 50 and the electronic circuit board 82) can be arranged compactly and efficiently in the substantially rectangular-parallelepipedic casing 12. This minimizes the connections between the components, and thus makes the camera more compact.

Particularly in this embodiment, the inlet 36A for the smart medium is formed at the side of the camera 10 opposite to the grip part 18. Therefore, it is easy to insert and extract the smart medium when the cameraman grips the grip part 18, or even when the camera 10 is fixed on the tripod, etc.

In this embodiment, one special rechargeable battery with a flat part 78A is used as the battery 78. The flat part 78A is formed by cutting the column along the long axis thereof. The battery may also be substantially column-shaped or rectangular-parallelepipedic. Also, a plurality of batteries may be arranged in parallel.

A description will now be given of the structure of the mode dial 54 and the cross key 56.

FIGS. 4, 5 and 6 show the structure of the mode dial 54 and the cross key 56. FIG. 4 is a plan view, FIG. 5 is a sectional view taken along line 5—5 of FIG. 4, and FIG. 6 is a back view. In FIGS. 4 and 6, a substrate 96 in FIG. 5 is omitted.

As shown in FIGS. 4–6, the dial control device applied to the electronic camera 10 comprises the button member 66, which composes the cross key 56; the ring member 68, which is provided at the circumference of the button member 66 and is equivalent to the mode dial 54; and a holding member 84, which holds the button member 66 and the ring member 68.

The button member 66 is dish-shaped with a central depressed area, and the triangular marks 72 indicating the four operating directions (upward, downward, right and left directions) are formed on a sloping part 66C, which slopes down from a circumferential edge part 66A to a flat part 66B. The four triangular marks 72 correspond to the upward key, the downward key, the left key and the right key of the cross key 56. The triangular marks are made of transparent material, and a lamp (which is not illustrated) is arranged below each mark. The lamp corresponding to the pressed key is turned on.

As shown in FIG. 5, an axis part 88 is integrated with the substantially central part of the bottom of the button member 66. The axis part 88 is inserted into a hole 84A, which is formed at substantially the center of the holding member 84. The inner diameter of the hole 84A of the holding member 84 is a little larger than the outer diameter of the axis part 88 of the button member 66, and thus, the axis part 88 is capable of slightly inclining in a desired direction around the centerline.

A leaf spring 92 is provided between the bottom of the button member 66 and the holding member 84. The leaf spring 92 forces the button member 66 upward in FIG. 5, and holds the axis part 88 vertically along the centerline so that the top face of the button member 66 can be horizontal.

Pins 94 project from the bottom of the button member 66 at four positions corresponding to the upward, downward, right and left keys. The pins 94 protrude from openings 84B of the holding member 84.

On the other hand, a button direction determining means or switch means 98 are arranged on the substrate 96, which is arranged below the holding member 84, so that the switch means 98 face the pins 94. When one point on the sloping part 66C of the button member 66 corresponding to the upward, downward, right or left key is pressed, the axis part 88 is inclined and the pressed part is moved downwardly, and the end of one of the pins 94 attached below the pressed part comes in contact with one of the switch means 98. When the thumb is removed from the button member 66 (releasing the pressed state), the button member 66 returns to the original horizontal state due to the force of the leaf spring 92, and all the pins 94 come apart from the switch means 98. The use of such a mechanism simplifies the mechanism of a four direction designating switch (a multiple function switch) for designating upward, downward, right and left directions.

On the other hand, the ring member 68, which is arranged outside the button member 66 on the holding member 84, is rotatable around the centerline of the button member 66 with respect to the holding member 84 independently from the button member 66. The ring member 68 has an oblique surface 68A, which slopes down from the height of the outermost circumferential part 66A of the button member 66 to the surface of the casing 12, and the whole dial control device is formed like a truncated cone.

Since the pressed part of the cross key 56 must have some thickness (height), this thick part of the cross key 56 is arranged inside the truncated cone-shaped ring member 68, which becomes thinner gradually from the thickness of the cross key 56 toward the outside. Such the arrangement reduces differences in level on the surface of the camera 10, makes the thickness of the dial control device inconspicuous, and improves the portability of the camera 10.

A metal plate 100 is arranged parallel to the substrate 96 below the ring member 68 across the holding member 84. The metal plate 100 is integrally connected to the ring member 68 through a connecting part 102 so that the metal plate 100 can rotate with the rotation of the ring member 68. The metal plate 100 is provided with a plurality of brushes 104 (four brushes in this embodiment) at the bottom thereof. The brushes 104 slide on contacts of the substrate 96 with the rotation of the ring member 68. The rotational positions of the mode dial 54 are determined in accordance with changes in the contact patterns of the brushes 104 and the contacts on the substrate 96.

Click holes 106 in number corresponding to the rotational positions (the mode setting positions) of the mode dial 54 are punched in the metal plate 100, and a leaf spring 108 is provided at the holding member 84. The leaf spring 108 can engage with one of the click holes 106 according to the rotational position of the mode dial 54.

A description will be given of the operation of the electronic camera, which is constructed in the above-mentioned manner.

To charge the battery 78, the battery cover 76 is sled to the right in FIG. 2, and the battery cover 76 is opened to insert the battery 78 from the bottom of the camera 10. At this time, the flat part 78A of the battery 78 is turned to the inside of the camera 10, and the battery 78 is pressed until the poles at the top end of the battery 78 contact with the terminal part (which is not illustrated) inside the camera 10. Then, the battery cover 76 is closed.

Then, a plug of an AC adapter (which is not illustrated) is inserted into the power input terminal 42 of the camera 10, and the AC adapter is connected to a power supply outlet. Thus, the charging of the battery 78 is started automatically. During the charging, the finder lamp 74 of the camera 10 is turned on in the orange color, and on completion of the charging, the finder lamp 74 is turned off. Even if the charging is incomplete, it is possible to use the camera 10 with the AC adapter connected thereto. After the completion of the charging, the AC adapter is detached and the camera 10 may be used only with the battery 78.

A description will now be given of the procedure for attaching and detaching the smart medium.

Sliding the smart medium knob 40 downward in FIG. 1 opens the smart medium cover 38, causing the inlet 36A of the smart medium holder 36 to be exposed. Then, the smart medium is inserted into the smart medium holder 36. At this time, terminals of the smart medium are turned to the front face of the camera 10, and the smart medium is slowly inserted into the smart medium holder 36 to the end thereof along a plane perpendicular to the image-capturing optical axis (the optical axis of the taking lens 14). When the smart medium cover 38 is closed after the insertion of the smart medium, a pawl formed on the cover 38 is engaged with the engaging means 39 so that the smart medium cover 38 can be kept in the closed state.

To extract the smart medium from the camera 10, the smart medium knob 40 is sled downward as the same manner with the insertion to open the smart medium cover 38. Then, the edge of the smart medium is slowly pressed into the smart medium holder 36 and is pinched, and the smart medium is extracted.

In this embodiment, the inlet 36A for the smart medium is provided at the side of the camera 10 and at the opposite side of the grip part 18, and therefore, the cameraman can insert and extract the smart medium while holding the grip part 18 of the camera 10. In this viewpoint, the camera 10 of this embodiment is better in operability than a conventional camera, which is constructed in such a way that the recording medium such as the smart medium is inserted and extracted through the top or bottom thereof or the same side as the grip part.

A description will be given of the image-recording operations.

Figure 7:
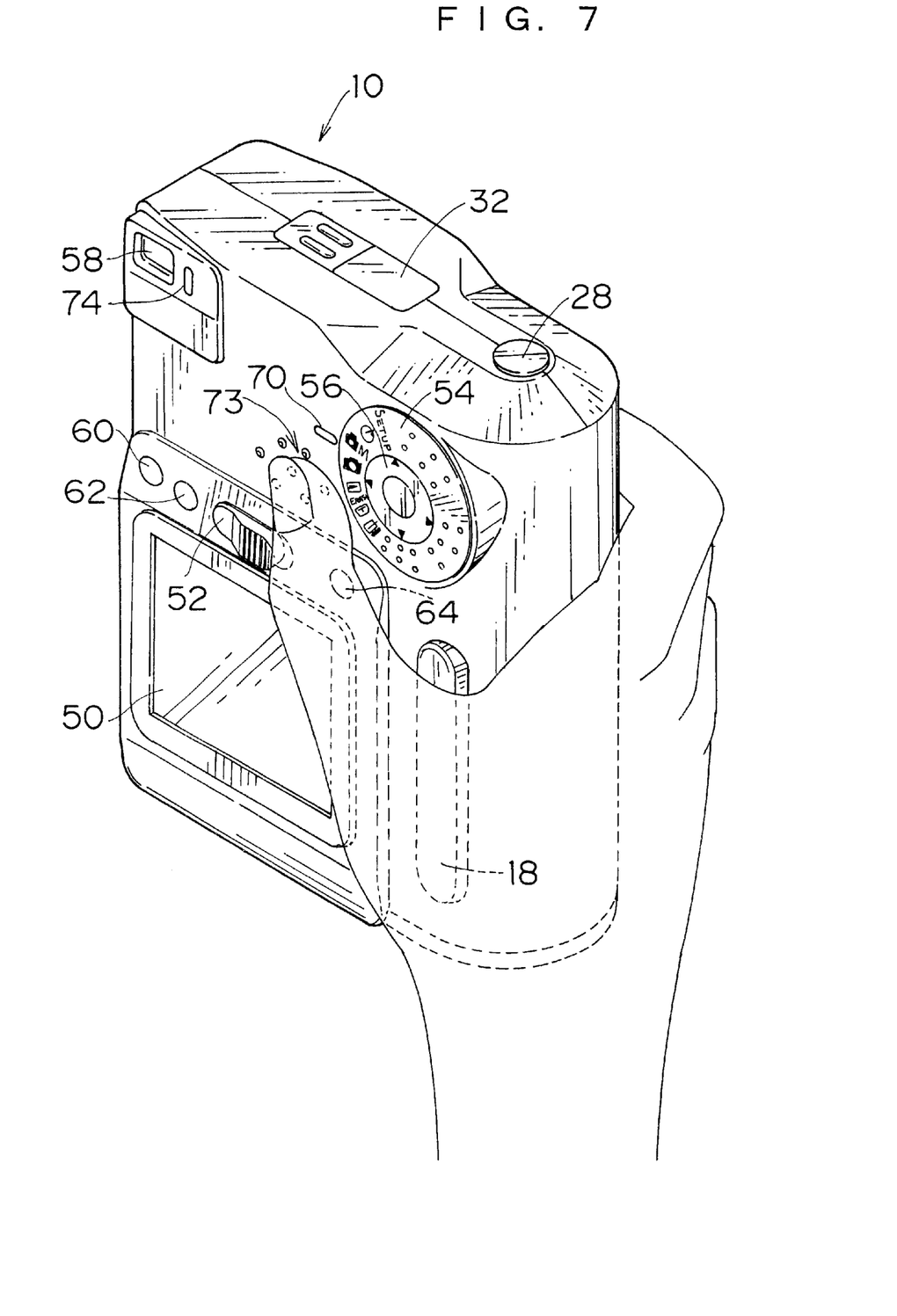
FIG. 7 is a perspective view illustrating the state wherein the electronic camera is held by a right hand.

As shown in FIG. 7, the cameraman holds the grip part 18 of the camera 10 by the right hand. When the cameraman slides the power switch 52 with the thumb to the right in FIG. 7 and removes the thumb from the power switch 52, an opening screen is shown on the LCD monitor 50. When the thumb is removed from the power switch 52, the power switch 52 returns to its original position due to the force of a pressing means (which is not illustrated).

Then, the mode dial 54 is rotated and set to a desired mode. The setup mode is to set the quality, pixels, the sharpness, color/black-and-white, frame number memory, the sound volume of a buzzer, the date, and the custom key. When the mode dial 54 is set to "setup", a setup screen is shown on the LCD monitor 50. The cameraman operates the vertical key of the cross key 56 to select an item to be changed on the setup screen, and changes the settings by operating the horizontal key to input a desired setting.

Specifically, the settings are changed every time the vertical key of the cross key 56 is pressed. When the desired setting is displayed, the vertical key is released. To fix the setting, the menu/execution key 64 is pressed or the mode dial 54 is changed to another mode.

For example, the following three qualities (recording compression rate) may be selected according to the purpose of image-recording: fine, normal and basic. The image data is compressed by ¼ (JPEG) in the case of the fine quality, the image data is compressed by ⅛ (JPEG) in the case of the normal quality, and the image data is compressed by 1/16 (JPEG) in the case of the basic quality. The number of recordable frames varies according to the selected quality, and whether the quality is fine, normal or basic is indicated on the liquid crystal panel 30.

The self-timer image-recording mode makes possible the self-timer image-recording for about ten seconds. When the mode dial 54 is set to the position of the self-timer, the word "self-timer" is shown on the LCD monitor 50. When the shutter release 28 is half pressed after the composition is determined, AE and AF start working. On completion of the focusing and the exposure adjustment, the finder lamp 74 is turned on in the green color, and the word "standby" is shown on the LCD monitor 50. Then, when the shutter release 28 is fully pressed, the self-timer lamp 26 at the front of the camera 10 starts lighting to execute the image-recording within about ten seconds.

In the manual image-recording mode, an image captured by the camera 10 is confirmed on the LCD monitor 50 (or a TV, etc. connected to the video output terminal 44), and whether the image is recorded in the smart medium or not is determined. In this mode, it is possible to set the white balance, the brightness (exposure correction), the brightness of the electronic flash, and the continuous image-recording (multi-recording).

When the mode dial 54 is set to the manual image-recording mode and the menu/execution key 64 is pressed, the setting items are displayed. The item is selected by the horizontal key of the cross key 56, and the settings are changed by the horizontal key. Then, the setting is fixed by the horizontal key. When the menu/execution key 64 is pressed during the input of the setting, the screen returns to original.

If the display key 62 is pressed in the manual image-recording mode, a moving picture (a so-called through moving picture) before the recording is displayed. When the cameraman determines the composition with reference to the display and half-presses the shutter release 28, the camera 10 automatically performs the focusing and the exposure adjustment. On completion of the preparations for the image-recording (on completion of AF and AE), the finder lamp 74 is turned on in the green color, and the word "standby" is shown on the LCD monitor 50.

Then, when the shutter release 28 is pressed fully, the buzzer sounds, and a preview picture (a temporally stored still picture) is shown on the LCD monitor 50. If the image data of the preview picture is not recorded in the smart medium, the downward key of the cross key 56 is pressed so that the preview picture can return to the through moving picture. On the other hand, if the image data of the preview picture is recorded in the smart medium, the menu/execution key 64 is pressed.

While the image data is recorded in the smart medium, the finder lamp 74 is turned on in the orange color, and the image-recording is prohibited while the finder lamp 74 is on. On completion of the recording, the buzzer sounds and the number of recordable frames shown on the LCD panel 30 is decreased by 1.

In the automatic image-recording mode, the camera 10 automatically controls the exposure (a combination of an electronic shutter value and a diaphragm value) and the focus, and the image data is automatically recorded in the smart medium in response to the full depression of the shutter release 28.

The automatic image-recording mode is easy to handle, and this mode is mainly used to perform the normal image-recording.

In the automatic image-recording mode, it is possible to select the image-recording using the optical finder without the use of the LCD monitor 50 or the image-recording using the LCD monitor 50. In order to reduce the consumption of the battery 78, it is preferable to select the image-recording using the optical finder. In order to determine the composition of the image correctly in the case of a close shot, etc., it is preferable to select the image-recording using the LCD monitor 50.

If the optical finder is used, an AF frame mark, which appears substantially at the center of the visual field of the finder 58, is set to a subject through the finder 58 to determine the composition. When the shutter release 28 is half pressed, the AE and AF functions start working. On completion of the preparations for the image-recording, the finder lamp 74 is turned on in the green color. Then, when the shutter release 28 is fully pressed, the buzzer sounds to inform the completion of the image-recording, and the recording of the image data in the smart medium is started. The finder lamp 74 is on in the orange color during the recording, and the image-recording is prohibited while the finder lamp 74 is on. The buzzer sounds on completion of the recording, and the number of recordable frames is decreased by 1 on the LCD panel 30.

On the other hand, if the LCD monitor 50 is used, the mode dial 54 is set to the automatic image-recording mode and the display key 62 is pressed. The display key 62 is to switch on and off the LCD monitor 50. Every time the display key 62 is pressed, the ON/OFF states of the LCD monitor 50 are switched.

When the display key 62 is pressed, the through moving picture is displayed on the LCD monitor 50. The cameraman determines the composition with reference to the display on the LCD monitor 50. If the display on the LCD monitor 50 is difficult to see, the brightness is adjusted by operating the monitor brightness adjustment dial at the bottom of the camera 10. After the determination of the composition, the shutter release 28 is half pressed and fully pressed to perform the image-recording.

In the case of the image-recording using the LCD monitor 50, a digital zoom (electronic zoom) image-capturing function may be used. Specifically, when the upper key of the cross key 56 is pressed in the state wherein the through moving picture is shown on the LCD monitor 50, a mark "x2" appears at the upper left corner of the screen of the LCD monitor 50. The central part of the image is enlarged twice about a central point of the screen. The composition is determined with reference to the LCD monitor 50, and the shutter release 28 is operated to perform the image-recording. Then, the data of the enlarged image is recorded in the smart medium.

The reproduction mode is set to reproduce the recorded images on the LCD monitor 50, the TV, etc., and there is a variety of modes therein. For example, one frame reproduction, multiple-frame reproduction (the images in a plurality of frames are reproduced at the same time on the screen), and an automatic reproduction (auto play) in which frames after the designated frame are reproduced continuously at regular intervals. It is also possible to enlarge the reproduced image in the electronic zooming, copy the image data to another medium, change the tone of the recorded image (make the skin look more beautiful or change the tone into sepia tone) and change the number of pixels (resizing). The functions are used by operating the cross key 54, the display key 62, the menu/execution key 64 and the custom key 60 in combination.

When the mode dial 54 is set to the reproduction mode, the last fame recorded in the smart medium is reproduced and is displayed on the LCD monitor 50, etc. To reproduce another frame, the right/left key of the cross key 56 is operated to switch the images on a frame-by-frame basis. When the right key is pressed once, the images are fed forward by one frame, and when the left key is pressed once, the images are reversed by one frame.

It is possible to use the reproduction zooming function during the reproduction of one frame. If the upper/lower key of the cross key 56 is operated during the reproduction of one frame, the reproduced image can be enlarged at an arbitrary magnification of once to four times about the center of the screen. In this case, the upper key is equivalent to an enlargement key, and the lower key is equivalent to a reduction key. If the cross key 56 is pressed while the custom key 60 is pressed, it is possible to move the zooming position. To stop the reproduction zooming function, the right/left key of the cross key 56 is pressed to change the images on a frame-by-frame basis.

The erasing mode is set to erase the image data recorded in the smart medium. It is possible to erase one frame, all frames or initialize the smart medium in accordance with the menu selection screen.

The image protecting mode is set to change the image data into read only data. It is possible to set or cancel the protection for the image data of each frame and cancel the protections for all frames at the same time.

The PC mode is set to transmit the image data between the electronic camera 10 and the personal computer, which are connected to each other through a special cable. The PC mode is used to send the recorded image into the personal computer, record the image in the smart medium by the personal computer and erase the image.

According to the electronic camera 10 of this embodiment, a variety of control parts such as the mode dial 54, the cross key 56, the power switch 52, the display key 62 and the menu/execution key 64 can be operated easily by using the thumb of the right hand holding the grip part 18. It is possible to operate the control parts such as the mode dial 54 and the cross key 56, which are used to change the display on the LCD monitor 50, with reference to the display on the LCD monitor 50 without covering the LCD monitor 50 by the hand.

The electronic camera of this embodiment minimizes the useless space by using the inner arrangement structure described in FIG. 3, so that the camera can be compact. Moreover, the smart medium as the recording medium can be inserted to and extracted from the side of the camera opposite to the grip part 18, and thus, the camera is easy to operate.

In addition, the mode dial 54 and the cross key 56 are constructed in the double structure as described in FIGS. 4–6. Thus, the multiple-function dial/button can be made slim and almost even, and the control device is easy to operate in a small space. The multiple-function dial/button is located in view of the relationship with the LCD monitor 50 so that the cameraman can operate the multiple-function button/dial with reference to the screen of the LCD monitor 50.

Therefore, the electronic camera of this embodiment is compact, slim and easy to operate.

In this embodiment, the thumb rest 73 is formed at the back face of the camera 10, but the depressed part of the button member 66 of the cross key 56 may also used as the thumb rest. When the part on or by the triangular mark 72 is pressed, the pressed part moves downward and the button member 66 inclines, whereas when the central part (the flat part 66B) of the cross key 56 is pressed, the central part does not move and the button member 66 does not incline. It is therefore possible to rest the thumb at the central part of the cross key 56 without operating the cross key 56, and the thumb can be rested steadily due to the depressed form of the cross key 56.

In this embodiment, the dial control device of the present invention is applied to the electronic camera, but it may also be applied to a wide variety of electronic equipment such as video cameras, cameras using silver-halide film, portable information terminals, electronic calculators, portable telephones, TV sets, remote controllers, etc.

As set forth hereinabove, according to the electronic camera of the present invention, when the camera is seen from the back thereof, the battery is arranged at the part corresponding to the inside of the grip part so that the long axis of the battery is along the right side of the casing, the imaging part is arranged at the upper left, and the image display and the recording part are arranged perpendicular to the imaging optical axis and below the imaging device. Thus, the components can be arranged in the minimum volume, and the inner space of the casing is not wasted at all. Moreover, it is possible to minimize the number of wires connecting the components. Therefore, the electronic camera can be compact.

According to the present invention, the image display for displaying the image is arranged at the lower left of the camera apart from the right hand holding the grip part, and thus, the display screen is easy to view. Moreover, the card-shaped recording medium is easily inserted and extracted from the opposite side of the grip part or the left side of the camera. Even if the camera is fixed on the tripod, etc., the recording medium can be inserted and extracted.

According to the present invention, the imaging part and the optical finder are integrated with the common optical block, and the optical finder is arranged at the upper left of the back of the camera. Thus, the cameraman can easily look through the finder.

According to the electronic camera of the present invention, the dial control device is arranged at the back face of the camera so that the dial control device can be operated by the thumb of the hand holding the grip part. For this reason, it is easy to operate the dial control device with one hand, and the control device, which is capable of changing multiple functions, can be formed in a small space.

In particular, the dial control device is arranged at the upper right corner of the back face of the camera, and the image display is arranged at the lower left of the dial control device. Thus, the screen of the image display is not covered with the hand of the cameraman when the dial control device is operated by the thumb of the hand holding the grip part. According to the present invention, the electronic camera has little unevenness on the surface and is easy to carry.

The dial control device of the electronic equipment according to the present invention comprises the ring-shaped rotary dial member and the button member, which is arranged at the center of the dial member and is capable of inclining freely in multiple directions. Thus, the multiple function dial/button with easiness of operation is made in a small space. In other words, the inner space can be used efficiently since the button part (the button control member), which must be thick, is arranged at the center, and the rotary dial (the dial member), which may be thin, is arranged at the circumference of the button control member. In addition, by shaping the dial control dial as the truncated corn, it is possible to provide the oblique surface around the rotary dial to improve the operability and reduce the difference in the height between the rotary dial and the surface of the casing around the dial. Thus, the electronic camera has the satisfactory appearance.

According to the present invention, the dial control device is thin, and the electronic equipment has the satisfactory appearance with little unevenness.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera comprising:
    an imaging part including a taking lens and an imaging device for capturing an image;
    an image display for displaying the image captured by the imaging part;
    a recording part for recording, in a card-shaped recording medium, image data representing the image captured by the imaging part;
    a battery for supplying electric power to the camera; and
    a casing for containing the imaging part, the image display, the recording part and the battery therein, the casing being substantially rectangular-parallelepipedic and provided with a grip part to be gripped on an external surface thereof;
    wherein, when the camera is seen from a back thereof,
    the grip part is arranged at the right part of the casing;
    the battery is arranged at the right part of the casing corresponding to an inside of the grip part such that a long axis of the battery is along the grip part and the right side of the casing;
    the image display is arranged along the back face of the casing and at the left of the battery so as not to overlap with the battery;
    the recording part is arranged behind and parallel to the image display such that the card-shaped recording-medium is inserted to and extracted from the left side of the casing along a plane perpendicular to an optical axis of the taking lens; and
    the imaging part is arranged above the recording part and thereby configured not to block the card-shaped recording medium when the card-shaiped recording medium is inserted into and extracted from the left side of the casing.

2. The electronic camera as defined in claim 1, further comprising a finder incorporated in an optical block including the taking lens and the imaging device.

3. The electronic camera as defined in claim 1, further comprising an electronic flash arranged above the battery.

4. The electronic camera as defined in claim 3, wherein the casing is provided with an electronic flash window part on the front face thereof, the electronic flash window part being provided with a projection for preventing a finger of a hand gripping the grip part from covering the electronic flash window part.

5. An electronic camera comprising:
    an imaging part including a taking lens and an imaging device for capturing an image;
    an image display for displaying the image captured by the imaging part, the image display being arranged on a back face of a camera body;
    a grip part for being gripped, the grip part being arranged at a side of the camera body;
    a dial control device arranged on the back face of the camera body at such a position as to be operated by a thumb of a hand gripping the grip part, the dial control device being capable of rotating within a plane perpendicular to an optical axis of the taking lens.

6. The electronic camera as defined in claim 5, wherein the dial control device is arranged at the upper right corner of the back face of the camera body, and the image display is arranged at the lower left of the dial control device.

7. The electronic camera as defined in claim 5, wherein one of instructions to switch displays on the image display and to change the display on the image display is entered through the dial control device.

8. The electronic camera as defined in claim 5, further comprising a control key for switching on and off the image display, the control key being arranged on the back face of the camera body at such a position as to be operated by the thumb.

9. The electronic camera as defined in claim 5, further comprising a thumb rest arranged on the back face of the camera body at a position reached by the thumb such that the thumb rests on the thumb rest when not operating the dial control device.

10. The electronic camera as defined in claim 5, further comprising a depressed part arranged at the center of the dial control device such that the thumb steadily rests on the depressed part when not operating the dial control device, the depressed part being formed on one of a member forming the dial control device and another member.

11. The electronic camera as defined in claim 5, wherein the dial control device is substantially truncated cone shaped and is provided with a skidproof part on an oblique surface thereof.

12. The electronic camera as defined in claim 5, wherein the dial control device comprises a ring-shaped dial member and a button control member arranged concentrically within the dial member, the button control member being able to incline in multiple directions corresponding to multiple functions.

13. A dial control device of electronic equipment comprising:
- a ring-shaped rotatable dial member;
- dial position determining means for determining a plurality of rotational positions of the dial member;
- a button control member capable of inclining in multiple directions according to a pressed position thereof, the button control member being arranged at the center of the dial member; and
- button direction determining means for determining at least two inclining directions of the button control members among a plurality of possible inclining directions.

14. The dial control device as defined in claim 13, wherein the button control member is provided with a depressed part on a top surface thereof.

15. The dial control device as defined in claim 13, wherein the dial control device is substantially truncated cone shaped, and the dial member is provided with a skidproof part on an oblique surface thereof.

16. The dial control device as defined in claim 13, wherein the dial control device is applied to an electronic camera which converts an image captured by an imaging means into an image signal and records image data representing the captured image in a recording medium.

17. The dial control device as defined in claim 16, wherein the dial control device is arranged on a back face of the electronic camera.

18. The dial control device as defined in claim 16, wherein at least one of instructions to change a zooming magnification during image-capturing and to advance frames during reproduction is entered through the button control member, and instructions to select and change modes during the image-capturing are entered through the dial member.

19. An electronic camera comprising:
- an imaging part including a taking lens and an imaging device for capturing an image;
- an image display for displaying the image captured by the imaging part;
- a recording part for recording, in a card-shaped recording medium, image data representing the image captured by the imaging part;
- a battery for supplying electric power to the camera; and
- a casing for containing the imaging part, the image display, the recording part and the battery therein, the casing being substantially rectangular-parallelepipedic and provided with a grip part to be gripped on an external surface thereof;
- wherein, when the camera is seen from a back thereof,
- the imaging part is arranged above the image display;
- the grip part is arranged at the right part of the casing;
- the battery is arranged at the right part of the casing corresponding to an inside of the grip part such that a long axis of the battery is along the grip part and the right side of the casing;
- the image display is arranged along the back face of the casing and at the left of the battery so as not to overlap with the battery; and
- the recording part is arranged behind and parallel to the image display such that the card-shaped recording medium is inserted to and extracted from the left side of the casing along a plane perpendicular to an optical axis of the taking lens.

20. An electronic camera comprising:
- an imaging part including a taking lens and an imaging device for capturing an image;
- an image display for displaying the image captured by the imaging part;
- a recording part for recording, in a card-shaped recording medium, image data representing the image captured by the imaging part;
- a battery for supplying electric power to the camera; and
- a casing for containing the imaging part, the image display, the recording part and the battery therein, the casing being substantially rectangular-parallelepipedic and provided with a grip part to be gripped on an external surface thereof; and
- a dial control device;
- wherein, when the camera is seen from a back thereof,
- the imaging part is arranged at the upper left part of the casing;
- the grip part is arranged at the right part of the casing;
- the battery is arranged at the right part of the casing corresponding to an inside of the grip part such that a long axis of the battery is along the grip part and the right side of the casing;
- the image display is arranged along the back face of the casing and at the left of the battery so as not to overlap with the battery;
- the recording part is arranged behind and parallel to the image display such that the card-shaped recording medium is inserted to and extracted from the left side of the casing along a plane perpendicular to an optical axis of the taking lens; and
- the dial control device is arranged on the back of the camera and operative to rotate within a plane perpendicular to an optical axis of the taking lens.

* * * * *